Patented Jan. 1, 1946

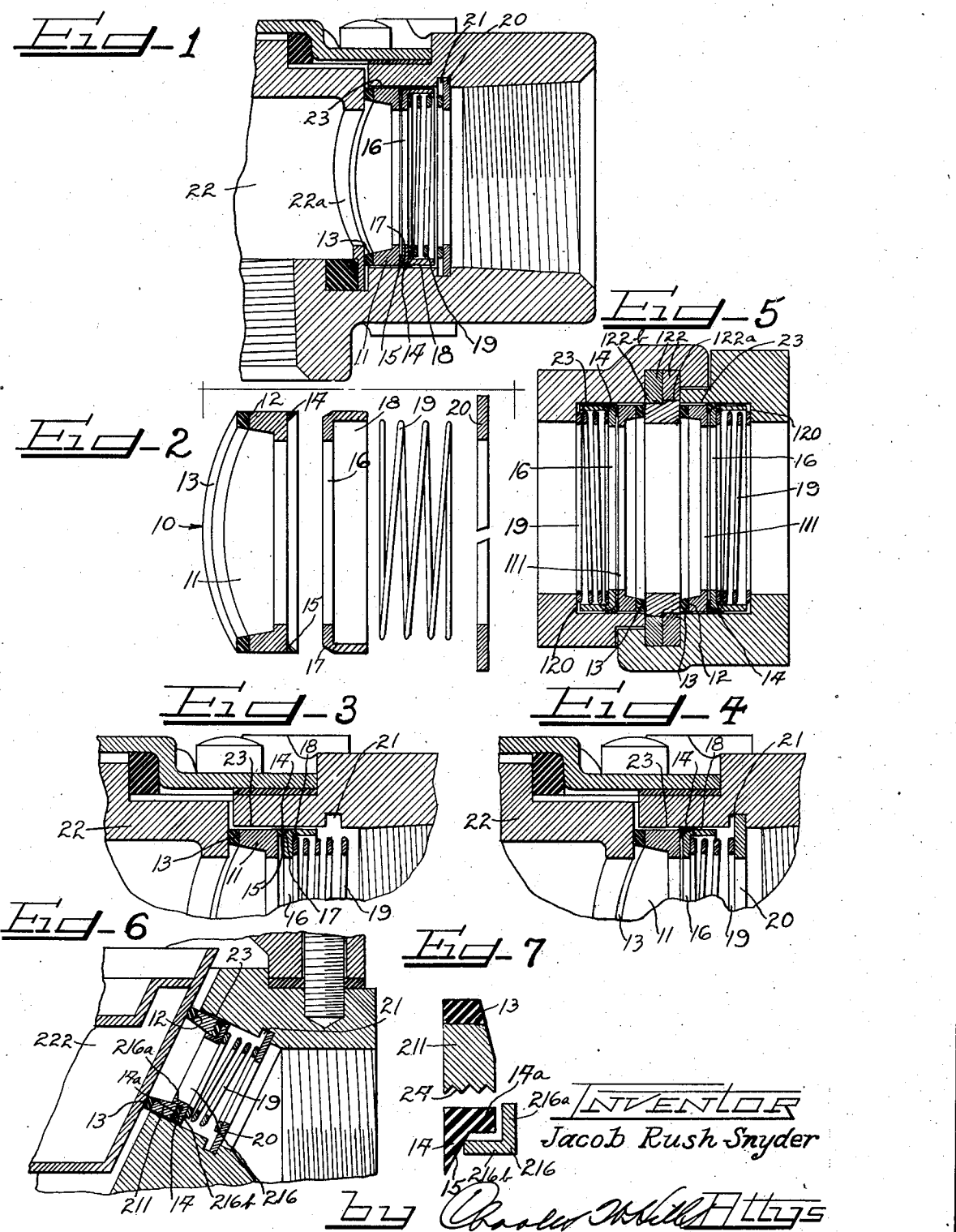

2,392,198

UNITED STATES PATENT OFFICE 2,392,198

SEAL ASSEMBLY

Jacob Rush Snyder, Cleveland, Ohio, assignor to Thompson Products, Inc., Cleveland, Ohio, a corporation of Ohio Application August 5, 1944, Serial No. 548,204

12 Claims. (Cl. 251—113)

This invention relates to improvements in seal assemblies for use in fluid flow control devices and the like.

More particularly, the invention relates to seal assemblies having end sealing faces, side wall sealing faces, and expander devices to radially extend said side wall sealing faces which seal assemblies are especially adapted to seal the ports and movable valve members of selector valves, quick disconnect couplings, shut-off valves, and the like.

Difficulty has been experienced in effectively sealing fluid control devices in vehicles of various types, and particularly in airplanes. In airplanes, for example, the internal and external pressures which the seal must withstand may vary considerably. Furthermore, the seal may be subjected to temperatures ranging from —80° F. to 250° F., since valves and couplings in aircraft must accommodate fluids such as aromatic fuels like gasoline, hot oil, hydraulic fluids, and the like. Such variations from normal temperatures result in considerable expansion or contraction of the seal, with consequent loss of sealing efficiency. Prior known sealing assemblies utilized deformable rubber seal surfaces that had to be heavily biased in order to insure a tight seal. Such heavy biasing resulted in rapid wearing of the seal surfaces, and in increased resistance to operation of the valve member being sealed. Such heavy biasing, moreover, resulted in increasing the inherent tendency of the rubber seal surface to adhere to the valve or flow control member, causing tearing and consequent failure of the sealing member.

The sealing assemblies of the present invention have deformable valve seal faces and port wall seal faces of thin section which eliminate the difficulties caused by excessive expansion and contraction of the seal since such thin sections can undergo a high proportional expansion and contraction rate without appreciable actual change in size so that an effective seal is provided regardless of the variations due to temperature. Since the deformable seal sections are thin, soft easily deformable materials such as soft synthetic rubbers can be employed, and this feature taken together with other features of the invention hereinafter described, permits a light biasing pressure to be employed in obtaining a perfect seal, so that the turning or sliding torque is kept at a minimum and damage to the sealing means is avoided. With the construction of the present invention, only a single biasing means is required to press the two seals in directions normal to each other, resulting in a very simple and effective seal assembly.

It is an object of this invention to provide a seal assembly requiring only light pressure for effective sealing.

It is another object of this invention to provide a seal assembly developing only a very low torque between relatively movable members to which the assembly is applied.

It is a further object of this invention to provide a seal that functions efficiently whether subjected to low pressures or high pressures.

It is still another object of this invention to provide a seal assembly in which the effect of expansion or contraction due to temperature changes is minimized to a point at which it is not detrimental to the efficiency of the sealing means.

It is a still further object of this invention to provide a seal assembly in which the tendency of the sealing material to adhere to relatively movable valve members is so reduced as to bring the break-away torque down to a very low value and avoid damage to the sealing material.

It is also an object of this invention to provide a seal which is efficient regardless of wide variations in the biasing thereof.

It is an additional object of this invention to provide a sealing assembly having a single biasing means to press two seals each in a direction normal to the other into sealing engagement with its respective sealed member.

Other and further objects and advantages of this invention will be apparent to those skilled in the art from the following descriptions and appended drawing.

In the drawing:

Figure 1 is a transverse sectional view of the sealing assembly of this invention applied to a selector cock with a cylindrical plug;

Figure 2 is an enlarged exploded sectional view of the seal assembly shown in Figure 1;

Figure 3 is an enlarged detailed sectional view of the sealing assembly applied to a selector cock with a cylindrical plug before application of the biasing pressure;

Figure 4 is a view similar to Figure 3 but showing the assembly after application of the biasing pressure;

Figure 5 is a transverse sectional view of a slightly modified sealing assembly applied to a quick disconnect coupling of the slide gate type;

Figure 6 is a transverse sectional view of another modified form of seal assembly applied to a selector valve having a conical plug; and Figure 7 is an enlarged detailed exploded sectional view of the sealing elements of the modified seal assembly shown in Figure 6.

Referring to Figure 2, the seal assembly is indicated generally at 10 and comprises a rigid seal backing or retainer member 11, preferably composed of metal, which is generally annular or cylindrical in shape and has one end face 12 formed to accommodate a cylindrical valve plug or the like. An annular sealing member 13 is bonded by cementing, vulcanizing, or the like to the end face 12 of the retainer 11, and a resilient annular sealing lip 14 is similarly bonded to the other edge of the retainer 11. The sealing lip 14 is triangular in cross section, preferably with one angle a right angle so that the outer periphery of the lip will be substantially flush with, and a cylindrical extension of, the outer periphery of the retainer 11. The inner face 15 of the annular lip 14 extends at an angle of preferably less than 45° from the outer face of the lip. The angle as shown in the drawing is about 30°. As will be clear, the retainer 11 and the seals 13 and 14 form a sealing unit which may readily be mounted in a fluid control device without requiring separate insertion of the sealing means.

An annular pressing follower or expander ring 16 is provided to pass within the lip 14, and has a beveled edge 17 substantially corresponding to the angle of the inner face 15 of the lip 14. The opposite face of the expander 16 is formed with a peripheral flange 18. A coil spring 19 is provided of a size to fit within the flange 18 and seat against the expander 16. A snap ring 20 is provided to act as an abutment member for the other end of the spring 19. The ring 20 may be inserted in a groove or against a shoulder formed in the wall of a port to be sealed by the lip 14. It will be obvious that other resilient or biasing means than the spring 19 may be employed, such, for example, as a spring washer, and that the snap ring 20 may be replaced by other abutment means, such as a shoulder in the wall of the port member.

It will be clear from the description of the seal assembly shown in Figure 2, together with the showings in Figures 1, 3 and 4, that when the elements are assembled in a selector valve, quick disconnect coupling, or similar fluid control device, the expander 16 is urged by the spring 19 toward the retainer 11, and by means of the contact between the bevel 17 and the face 15 of the lip 14 not only brings the seal 13 into sealing engagement with the valve member but expands the lip 14 so that the outer peripheral face thereof seals against the wall of the port in which the assembly is mounted. As the expander 16 is moved toward the retainer 11, there is a camming or wedging action of the bevel 17 against the angled face 15 of the lip 14 which continues until the pressure of the outer face of the lip 14 against the port wall becomes great enough to prevent further movement of the expander 16 toward the retainer 11.

The expander 16 does not contact the retainer 11, the lip 14 and expander 16 being so proportioned that the expander 16 always has its bevel 17 in expanding contact with the angled face 15, and thus acts as an automatic compensator for shrinkage, permanent set, or loose manufacturing tolerances of the lip 14.

The flange 18 has a sliding fit in the port, and since, as shown, it presents a broad surface in contact with the port wall 23, tilting or cocking of the expander 16 is prevented and the expander is made self-aligning, so that the lip 14 is forced into proper sealing engagement with the port wall 23 even though uneven loading of the spring 19 may occur, or other conditions tend to impair the seal provided by the lip 14.

The sealing ring 13 and the sealing lip 14 are made of a resilient deformable material resistant to hydrocarbons such as synthetic rubber, resilient plastic compositions, or other similar material. The material employed is relatively soft, having a durometer hardness of approximately 50 to 70, C scale, so that it will easily deform into good sealing contact with the port to be sealed even when urged thereagainst with only light pressure.

The seal assembly described is shown in Figures 1, 3 and 4 as inserted in a selector cock, an annular groove 21 being provided in a port wall 23 of the selector cock casing to accommodate the snap ring 20 which serves as an abutment member for the spring 19. A rotatable cylindrical cut-off plug or valve 22 having an opening 22a for registration with the port is provided in the selector cock, and the seal ring 13 seals against this plug 22 and about the opening 22a. The sealing lip 14 seals against the port wall 23 when expanded by the expander 16 under the pressure of the spring 19 or other biasing means, as shown in Figures 1 and 4, although there may be a slight clearance between the lip and the wall 23 when the spring 19 is not urging the expander 16 toward the retainer 11, as shown in Figure 3.

Since seals of selector cocks may be subjected to cross pressure, that is, pressure between the outside of the plug and the housing, at times when there may be zero pressure or vacuum on the inside of the seal assembly, it is very important that the outer diameter wall of the seal 13 fit neatly in the port 23, preferably parallel with the port wall, but in any event being shaped so that such cross pressure in the space between the plug and housing around the seal cannot force its way between the plug and the seal 13. With the construction of this invention a sealing engagement is provided which prevents the cross pressure from blowing by the seal, and yet requires the use of only a relatively light biasing pressure to accomplish this desired sealing. The fact that only light pressure is required contributes to low turning torque for the plug, thereby increasing the life of the seal 13 and adding to the ease of operation of the selector cock or other fluid control device.

In Figure 5, the invention is shown as applied to a quick disconnect coupling in which the cut-off member for each of the cooperating coupling member is an apertured gate or plate 122 slidable relative to the bore axis to open or close the bore. A ring 122a with a pilot portion 122b is press fitted or otherwise secured in the aperture of one plate 122, with the pilot portion 122b extending into the aperture of the other plate 122 to prevent relative sliding movement between the plates. In this modification, two seal assemblies are provided, one in each coupling member. Since the assemblies and coupling members are identical, a description of the assembly in one coupling member will be sufficient for clearness. An abutment shoulder 120 is provided in the port of the coupling member, on which the end of the spring 19 bears, instead of the snap ring 20 provided in the first-described form of the invention. A metal or other rigid material retainer 111 is provided, similar to the retainer 11 of the first-described form, but with the edge 12 contacting the sealing ring 13 being flat to conform to the plate 122 instead of dished to conform with the contour of the cylindrical plug 22. The sealing ring 13 seals against the cut-off plate valve 122 and the sealing lip 14 seals against the port wall 23 in the same manner as described in connection with the first form of the invention. The ring 13, retainer 111, and lip 14 are bonded together.

In the modification shown in Figures 6 and 7, the sealing member 13 is bonded to a retainer 211 on the edge 12 thereof, as in the other forms of the invention. The other edge of the retainer 211, however, is formed with a plurality of concentric V-shaped grooves 24 therein providing gripping serrations. The lip 14 is formed with a base portion 14a to abut the grooved edge of the retainer 211, and which may be deformed into the grooves 24 by relatively light pressure. The lip 14 with its base 14a in this modification is not bonded to the retainer 211. The expander in this form of the invention takes the form of an annular member 216 having an axial flange or guide portion 216a with an outer diameter corresponding to the inner diameter of the retainer 211 at its grooved edge, and a radial flange 216b of such diameter that its outer periphery contacts the angled face 15 of the lip 14 in substantially the same way as the beveled edge 17 of the expander 16 in the previously described forms of the invention. The spring 19 and snap ring 20 seated in a groove 21 in the port wall are provided as in the first form of the invention, although, as already pointed out, other equivalent elements may be substituted. This modified form of the invention is shown as applied to a selector valve having a hollow conical plug 222 against which the sealing member 13 sealingly engages with the sealing lip 14 sealing against the port wall 23, the port extending at an angle so as to be perpendicular to the wall of the plug 222.

The operation of this modification of the invention is substantially similar to that of the other two forms described.

The retainer 211 is inserted in the port with the sealing member 13 engaging the plug 222, the sealing lip 14 is inserted with its face 14a adjacent the grooved edge of the retainer, and the expander 216 is positioned with its guide portion 216a telescoped in the retainer 211 and the face 14a, and its radial flange 216b contacting the inner face 15 of the lip 14. The spring 19 bears on the flange 216b. The pressure of the spring 19 or its equivalent forces the base 14a into the grooves 24 of the retainer, effectively sealing the junction between the retainer and the lip. The sealing member 13, of course, is urged into effective sealing engagement with the plug. At the same time, the edge of the flange 216b of the expander 216 wedges the lip 14 into effective sealing engagement with the port wall 23. To prevent the possibility of external pressure separating the outer edge of the face 14a from the grooved edge of the retainer and thus possibly eventually working between the face 14a and the retainer, the groove 24 should be formed as shown, that is, with the walls of the radially innermost and outermost grooves terminating at the inner and outer faces of the retainer 211, respectively, so that the radially inner and outer edges of the face 14a are overlapped by the inner and outer sides of the retainer. The guide portion 216a of the expander 216 overlies the junction of the retainer 211 and the base 14a and prevents expansion of the base radially inwardly, tending to cause it to expand toward the port wall 23 and into the grooves 24 under the pressure of the radial flange 216b.

In the drawing, the clearance between the port wall 23 and the elements of the seal assembly, and the thickness of the sealing element 13, have been exaggerated for clearness. The thickness of the seal member 13 may vary considerably, although it has been found that for a port of 1 or 2 inches in diameter, a thickness of the order of $\frac{1}{16}$ of an inch for the sealing member 13 is very satisfactory.

The retainer may be, and preferably is, coated with a thin layer of the rubber or rubber-like material of which the sealing members 13 and 14 are formed. This provides a protective coating for the retainer and increases the adhesion of the sealing members to the retainer. In addition, the cost of removing flash resulting from bonding the sealing material to the retainer in a mold is reduced, since such flash need be removed only from the outer edges, which are inexpensive to trim.

The use of a relatively soft material for the sealing members, as already pointed out, permits the use of relatively light biasing force to obtain efficient sealing, to minimize torque, and to lessen the possibility of damage to the sealing material. Another very advantageous feature of this use of a relatively soft sealing material is that efficient sealing is obtained even though the biasing force may vary through a wide range. Tests indicate that the biasing force may vary almost 100% and perfect sealing still be obtained. This feature is particularly important in selector cocks and valves, since perfect sealing will be obtained at all ports even though the biasing force of the seal assembly in one port varies from that of the assembly in another port. Similarly, slight variations in the clearance between the plug or valve and the various ports will not effect the efficiency of the seal, since such variations will be well within the compensatory range of the biasing pressure which effects perfect sealing.

I claim as follows:

1. A seal assembly comprising an annular deformable seal, a rigid cylindrical member having one edge bonded to said seal, an annular deformable sealing lip bonded to the other edge of said cylindrical member and having its inner face flared radially outwardly therefrom, an annular expander with an outer diameter greater than the smallest internal diameter of said lip, an abutment member, and a spring between said abutment member and said expander.

2. A seal assembly comprising an annular deformable sealing member, a cylindrical retainer having one edge bonded to said sealing member, a deformable sealing lip of triangular cross-section having its base bonded to the other edge of said retainer, an annular expander having a bevel on one edge corresponding to the angle of the inner face of said lip and bearing on said face, and resilient means urging said expander toward said retainer.

3. A seal assembly for a ported member and a movable member to open and close the port of said ported member, comprising an annular seal retainer, a first sealing member on one edge of said retainer, a second sealing member contacting the other edge of said retainer, said other edge having a plurality of grooves therein, said second sealing member having a base deformable into said grooves and a lip with an inner face flaring radially outwardly, a collar member having a body portion telescopingly engaged in said retainer and base and overlying the junction therebetween and also having a radial flange with its outer edge contacting said flaring inner face of said lip, and biasing means urging said collar member toward said first sealing member to press said first sealing member against said movable member and to press the base of said second sealing member into said retainer grooves and expand said lip by the coaction of said flange and said flaring inner lip face.

4. A sealing assembly comprising a deformable annular sealing member, a cylindrical retainer having one edge bonded to said sealing member, a plurality of grooves in the other edge of said retainer, an annular deformable sealing lip having a base and an inner face lying at an angle between the inner and outer peripheries of said lip, an annular guide member having a collar telescopingly engaging the inner peripheries of said retainer and base and overlying the junction thereof and also having a radial flange portion with its outer edge bearing on said inner lip face, and biasing means urging said guide member toward said retainer to press said sealing member, to deform said sealing lip base into said retainer grooves, and to expand said lip radially by camming action of said guide flange on said inner lip face.

5. A seal assembly comprising a retainer, first sealing means on one edge of said retainer, second sealing means on the other edge of said retainer of triangular cross-section, an expander peripherally contacting an angled face of said second sealing means, and biasing means urging said expander toward said retainer to expand said second sealing means into sealing condition and to urge said first sealing means into sealing position.

6. In a flow control device embodying a member having a port and a movable member to open and close the port, a sealing assembly for said port comprising a first sealing means for said movable member, a second sealing means for said port in opposed relation to said first sealing means and having an outer sealing face and an inner wedging face at an angle to said outer face, an expander, and a biasing member urging said expander against said wedging face to expand said outer face to seal said port and to urge said first sealing means into sealing engagement with said movable member.

7. A seal for a flow control device having a port and a movable port opening and closing member, comprising a seal retainer having one edge shaped to accommodate said movable member, a resilient seal for said member on said retainer edge, a resilient sealing lip for said port on the opposite edge of said retainer, said lip having a port sealing surface, a retainer contacting surface, and a wedging surface extending at an angle between the edges of said two surfaces, an expander contacting said wedging surface, and resilient means urging said expander axially of said lip to expand the port sealing surface of said lip outwardly to seal said port and urging said resilient seal into sealing engagement with said movable member.

8. A sealing assembly for a ported member having a movable member to open and close the port, comprising an annular seal retainer, a sealing member for said movable member secured to one edge of said retainer, a sealing lip for said port on the other edge of said retainer having an outer sealing face and an inner face forming an angle with the free edge of said sealing face, an annular member contacting said inner face and upon movement toward said retainer expanding said sealing lip to seal said port, and resilient means urging said annular member toward said retainer to expand said sealing lip and urge said sealing member against said movable member.

9. A seal assembly comprising an abutment member, an annular pressing member, a coiled spring with one end bearing on said abutment member and the other end bearing on said pressing member, an annular sealing lip having an inner face flared circumferentially outwardly and receiving said pressing member, an annular retainer having one edge engaging said sealing lip, and a sealing ring on the other edge of said retainer.

10. A seal for a movable valve member and a port wall comprising a sleeve assembly including a thin-sectioned axially deformable portion on one end and a thin-sectioned radially deformable portion on the other end, an expander ring for radially expanding the radially deformable portion, and a spring acting on the expander ring to axially load the axially deformable end and to radially load the radially deformable end whereby temperature changes of the assembly will only slightly vary the dimensions of the deformable portions due to the thin sectional dimensions thereof.

11. A seal assembly for a flow control device having a port and a movable member to open and close the port, comprising a first seal for said movable member, a second seal of annular form for said port in opposed relation to said first seal and radially expansible into circumferential sealing engagement with said port, an annular expander for said second seal having a portion engaging the inner periphery thereof and having a skirt portion snugly engaging said port, and biasing means urging said expander toward said movable member to press said first seal thereagainst and to expand said second seal.

12. A seal assembly for a movable valve member and a port wall comprising a first axially deformable seal for said valve member, a second radially deformable seal for said port wall, and a sleeve slidably engaging said port wall and adapted to deform said first seal axially and second seal radially upon sliding movement toward said first seal.

JACOB RUSH SNYDER.